US008799948B2

(12) United States Patent
Papaspyropoulos

(10) Patent No.: US 8,799,948 B2
(45) Date of Patent: Aug. 5, 2014

(54) EPG ALIGNING EVENTS BY TIME ON CYLINDER

(75) Inventor: Andreas Papaspyropoulos, Brussels (BE)

(73) Assignee: Sony Europe Limited, Weybridge (GB)

( * ) Notice: Subject to any disclaimer, the term of this patent is extended or adjusted under 35 U.S.C. 154(b) by 576 days.

(21) Appl. No.: 12/887,861

(22) Filed: Sep. 22, 2010

(65) Prior Publication Data

US 2011/0078738 A1    Mar. 31, 2011

(30) Foreign Application Priority Data

Sep. 25, 2009 (GB) .................................... 0916899.8

(51) Int. Cl.
*H04N 21/482* (2011.01)
*H04N 21/431* (2011.01)

(52) U.S. Cl.
USPC .................................. 725/39; 725/44; 725/40

(58) Field of Classification Search
CPC .................................................... H04N 21/482
USPC ...................................................... 725/37–61
See application file for complete search history.

(56) References Cited

U.S. PATENT DOCUMENTS

| | | | | |
|---|---|---|---|---|
| 6,005,601 A * | 12/1999 | Ohkura et al. | ................... | 725/52 |
| 6,412,110 B1 | 6/2002 | Schein et al. | | |
| 6,462,784 B1 | 10/2002 | Kohno et al. | | |
| 6,857,128 B1 * | 2/2005 | Borden et al. | ................... | 725/39 |
| 7,685,619 B1 * | 3/2010 | Herz | ................................ | 725/52 |
| 2002/0144264 A1 | 10/2002 | Broadus | | |
| 2003/0167466 A1 * | 9/2003 | Nakamura et al. | ............... | 725/39 |
| 2003/0177495 A1 * | 9/2003 | Needham et al. | ................ | 725/55 |
| 2005/0108752 A1 * | 5/2005 | Nishikawa et al. | .............. | 725/39 |
| 2007/0011702 A1 * | 1/2007 | Vaysman | ......................... | 725/45 |
| 2007/0250865 A1 * | 10/2007 | Krakirian | ......................... | 725/58 |
| 2008/0320523 A1 * | 12/2008 | Morris et al. | .................... | 725/47 |
| 2009/0077590 A1 * | 3/2009 | Nielen | .............................. | 725/47 |
| 2009/0210792 A1 * | 8/2009 | Proehl et al. | ................... | 715/720 |

FOREIGN PATENT DOCUMENTS

| EP | 1 122 946 A2 | 8/2001 |
|---|---|---|
| EP | 1 122 946 A3 | 8/2001 |
| WO | WO 2006/051512 A2 | 5/2006 |
| WO | WO 2006/051512 A3 | 5/2006 |

* cited by examiner

*Primary Examiner* — Hunter B Lonsberry
*Assistant Examiner* — Cynthia Fogg
(74) *Attorney, Agent, or Firm* — Oblon, Spivak, McClelland, Maier & Neustadt, L.L.P.

(57) ABSTRACT

An apparatus 100 and method is provided for generating an EPG. The apparatus 100 is configured to output data to generate an EPG in which upcoming programs are shown as tiles with a uniform size, regardless of the duration of the program. A tile representing a program which has already partially been shown is shown as spanning a reference indicator. The apparatus 100 may output data to automatically update the EPG when a new time is selected by a user. The automatic updating of the EPG may involve scrolling the tiles of the EPG past the reference indicator which represents a reference time. The rate of scroll of the tiles may be in inverse proportion to the duration of the program being shown on that program.

19 Claims, 6 Drawing Sheets

US 8,799,948 B2

EPG ALIGNING EVENTS BY TIME ON CYLINDER

CROSS-REFERENCE TO RELATED APPLICATIONS

This application is based upon and claims the benefit of priority from British Application No. 0916899.8 filed 25 Sep. 2009, the entire contents of which are incorporated by reference.

BACKGROUND OF THE INVENTION

1. Field of the Invention

The present invention relates to apparatus and method for enabling a user to interact with, or control, an electronic device, such as a television. The apparatus and method enables a user to interact with, or control, an electronic device in a more efficient and intuitive manner.

Entertainment systems, such as televisions, are becoming increasingly versatile and powerful. Many entertainment systems now provide the user with the option of performing various different functions. They may enable a user to access a vast quantity of information. For example, an entertainment system might typically give a user access to a vast number of television and/or radio channels, which may be broadcast channels and/or on-demand channels. A typical entertainment system might also be able to provide information about upcoming programs that are scheduled to be broadcast on the available channels.

2. Description of the Related Art

The increase in functionality of entertainment systems, and the associated increase in information and options available to the user of such an entertainment system, requires an improved interface in order to enable a user to control and interact with the entertainment system in an intuitive and efficient manner. Conventionally, apparatus has been developed for enabling a user to interact with an entertainment system, such as a television, through an electronic program guide (EPG). However, this conventional apparatus has resulted in electronic program guides which are not easy to use and which may provide confusing information to a user and/or make control of the entertainment device difficult.

OBJECTS AND SUMMARY OF THE INVENTION

According to the present invention there is provided an apparatus for generating an EPG, the apparatus comprising:

a display generation unit configured to output data for generating an EPG that has an upcoming schedule display region that shows programs scheduled for broadcast at or after a first time for a plurality of channels, all programs being represented by equally sized tiles in the EPG; and a calculation unit for calculating a non-elapsed portion of each started program that has not elapsed at said first time, a started program being a program that is being shown at said first time on each of the plurality of channels, wherein the display generation unit is further configured to output data to display the tiles representing started programs in a position in the EPG such that only a portion of the area of the tile that represents each started program is displayed in the upcoming schedule display region, the portion being equal to the portion of non-elapsed time calculated by said calculation unit According to the present invention there is also provided method of generating an EPG, the method comprising:

generating an EPG that has an upcoming schedule display region that shows scheduled programs for broadcast at or after a first time for a plurality of channels, all programs being represented by equally sized tiles in the EPG;

calculating a non-elapsed portion of each started program that has not elapsed at said first time, a started program being a program being shown at said first time on each of the plurality of channels, wherein only a portion of each tile that represents a started program is displayed in the upcoming schedule display region, the portion being equal to the portion of non-elapsed time calculated by the calculation unit.

Providing such an apparatus and method for generating an EPG enables the user of an entertainment device that employs the EPG (for example by incorporating the apparatus, interacting with the apparatus, or using the method for generating the EPG) to interact with and/or control the entertainment device in a more efficient and/or intuitive manner. The apparatus and method for generating an EPG may additionally or alternatively allow a user to access information about the entertainment device (such as upcoming program information) in an intuitive and efficient manner. Providing a display generation unit that is configured to output only a portion of an area of the tile that represents a started program enables a user to quickly and intuitively compare programs that are available on a plurality of channels. Using a display generation unit to output data to display programs as equally sized tiles in an EPG enables a user to quickly understand programs that are scheduled to be shown on a variety of channels, without being overloaded with information which may not, at least initially, be required, such as program duration. The apparatus and method may generate data to produce an EPG for display on a display device.

The display generation unit may be further configured to output data to generate a lapsed schedule display region in the EPG, and to display the portion of each tile representing a started program that is not displayed in the upcoming schedule display region in the lapsed display region. Having two separate regions, one of which contains information about the upcoming part of the program, and the other of which contains information about the lapsed part of the program enables the user to easily see what portion of the program remains, and what portion has already been shown.

The display generation unit may be further configured to output data for generating a reference indicator in the EPG that corresponds to the first time. Through the reference indicator, a user interacting with the EPG can readily see what programs are being shown on a variety of channels at a particular time of interest. They may also be provided with information about the upcoming programs due to be shown after the first time.

The reference indicator may be a line. The line may provide a particularly intuitive way in which to represent a time of interest on the EPG.

The reference indicator may form part of the boundary of the upcoming schedule display region of the EPG. In this way, the user of the EPG is able to focus on a particular area of the EPG (the upcoming schedule display region) in order to be provided with the information about currently showing and scheduled programs. The reference indicator may additionally or alternatively form part of the boundary of the lapsed schedule display region.

The reference indicator may be in a fixed position in the EPG. Thus it may be in the same position regardless of what else is being shown in the EPG. This provides an easily recognisable reference position to the EPG through which the user can immediately recognise the part of the EPG that represents the current, or desired, time.

Each channel may have tiles representing the same, fixed number of programs. This means that, regardless of the duration of the programs, the user can always identify the next one or more programs to be shown on each channel. For example, each channel may have tiles representing one, two, three, four, five, six, seven, eight, nine, ten or more than ten programs.

The apparatus or method of the present invention may generate any suitable form or layout of EPG. For example, the display generation unit may be configured to output data to map the tiles of each channel onto the surface of a respective cylinder representing that channel displayed in the EPG; and the cylinders for respective channels may be axially aligned and axially offset from each other such that the EPG comprises a compound cylinder showing program information from the plurality of channels. Such a layout may be particularly convenient for providing a user with the required information, in an uncomplicated manner.

The apparatus of the present invention may further comprise a time selection receiving unit configured to receive a desired time input by a user. The method and apparatus may be further configured to receive a desired time selected by a user, and may use the desired time to update the EPG in a continuous manner between the first time and the desired time by scrolling the tiles. An apparatus may be provided in which:

a time selection unit configured to receive a desired time selected by a user is provided; and the display generation unit is configured to update the EPG to show scheduled programs for the plurality of channels starting from said desired time by outputting data to:

update, over a period of time and in a continuous manner, the time to which the reference indicator corresponds from the first time to the desired time; and scroll the tiles that represent the programs being shown on each channel at the time represented by the reference indicator past the reference indicator so as to continuously update the EPG such that it corresponds to the time represented by the reference indicator.

Accordingly, the apparatus and method may provide a user with still more details relating to an entertainment system, such as a television, in an intuitive manner. For example, the user would be able to easily assimilate information relating to the duration of each of the programs being shown at the time represented by the reference indicator simply by the rate of scroll of the respective tile.

The display generation unit may be configured to output data to scroll all of the tiles in the EPG towards or away from the reference indicator so as to continuously update the EPG such that it corresponds to the time represented by the reference indicator. As such, all of the tiles in the EPG may be scrolled towards or away from the reference indicator so as to enable the user to easily understand, for example, how much of the program being shown at the time represented by the reference indicator remains, and/or how long remains before the next scheduled program on each channel begins.

The display generation unit may be configured to output data to scroll each tile that is being scrolled at a rate that is inversely proportional to the total duration of the program being shown on the channel to which the tile is associated at the time represented by the reference indicator. As such, when the EPG is being updated from the first time to the desired time, it is particularly easy for the user to understand the duration of the program being shown at the time represented by the reference indicator on each channel. Furthermore, the relative total durations of the programs being shown at the time represented by the reference indicator on each of the different channels can be conveyed to the user in a particularly efficient and intuitive manner.

In an embodiment in which the tiles are displayed on respective cylinders, the display generation unit may be configured to output data to cause at least a part of each of the cylinders to rotate so as to scroll the tiles towards or away from the reference indicator. The at least a part of each of the cylinders that is caused to rotate may be the part of the cylinder that represents the upcoming schedule display region. It may also include the lapsed schedule display region. By scrolling a part of a cylinder that is used to represent the channel, the user may be provided with information about the upcoming programs on an entertainment device in a particularly intuitive manner that enables them to interact with the entertainment device efficiently.

The display generation unit may be configured to output data to rotate said at least a part of each cylinder at a rate that is inversely proportional to the total duration of the program being shown on the channel to which the respective cylinder is associated at the time represented by the reference indicator. By rotating the at least a part of each cylinder at a rate inversely proportional to the duration of the program being shown at the time represented by the reference indicator, the user can easily understand how long the program being shown at the time represented by the reference indicator is. Furthermore, the user can easily understand how long the program being shown on one channel is relative to the programs being shown on the other channels.

The apparatus may comprise a display device, and the display generation unit may be configured to output the display data to the display device so as to generate an EPG on the display device. Similarly, the method may comprise displaying an EPG on a display device. In this way, the EPG generated by the apparatus or method of the present invention can be viewed by a user.

The apparatus and/or method for generating an EPG according to the present invention may be incorporated into any suitable entertainment device. For example, the apparatus and/or method of generating an EPG according to the present invention may be incorporated into a television set or a set-top box. In this way, the advantages of the present invention may be provided with the entertainment device itself. By way of further example, the apparatus and/or method of the present invention may be incorporated into (or implemented in) a personal computer, a TV receiver for connection to a personal computer (for example a USB or PCI device), and/or a portable receiver device, such as a mobile or cellular telephone (for example using a DVB-H tuner).

The method of generating an EPG described and claimed herein may be provided as a computer program capable of execution by an apparatus for generating an EPG from program information contained in a database, the computer program being configured to cause the method for generating an EPG on execution. The computer program may be stored on a storage medium.

BRIEF DESCRIPTION OF THE DRAWINGS

The invention will be more clearly understood from the following description, given by way of example only, with reference to the accompanying drawings, in which.

DETAILED DESCRIPTION OF THE PREFERRED EMBODIMENTS

Figure 1:
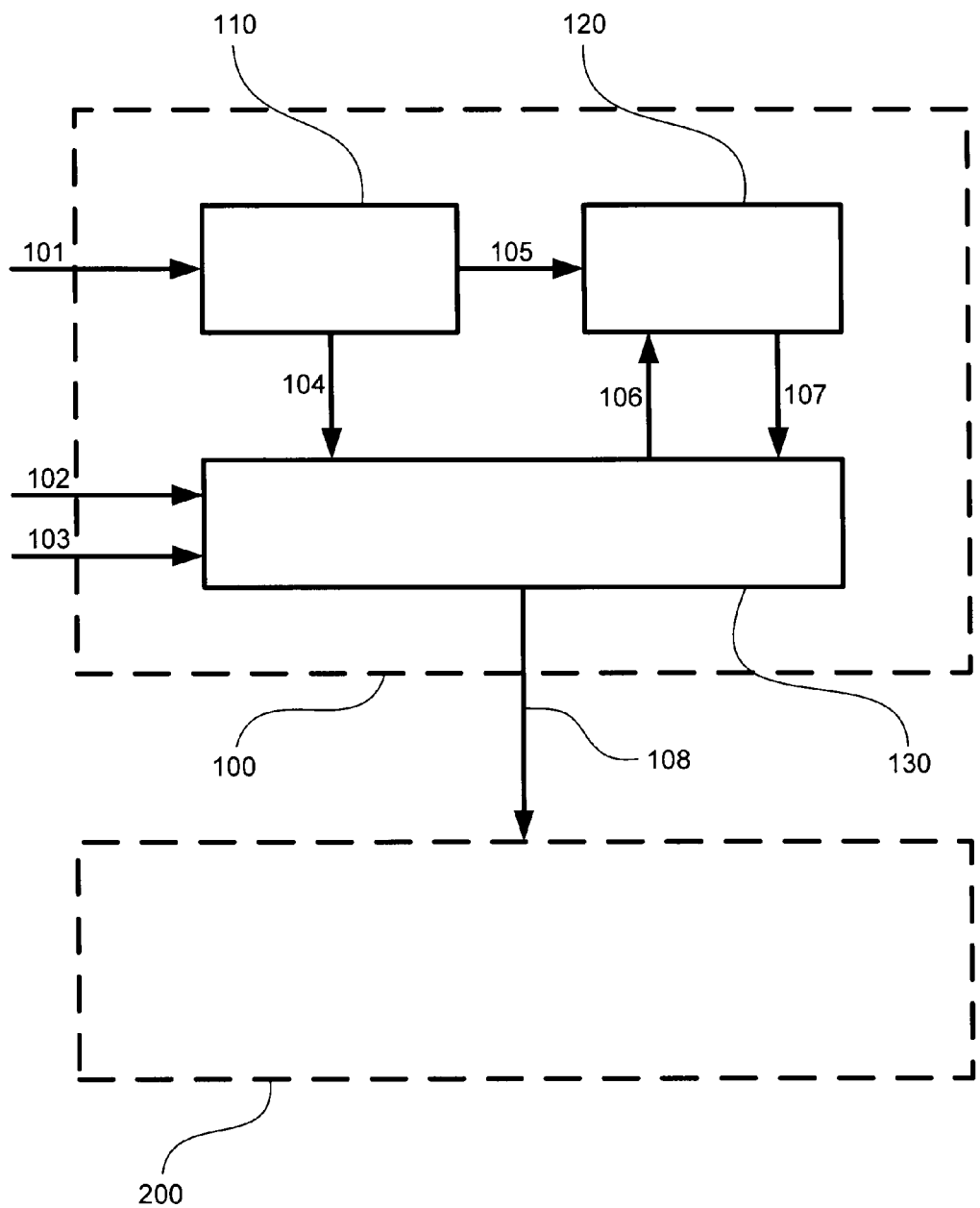
FIG. 1 illustrates the components of an apparatus for generating an EPG according to the present invention.

EPGs are conventionally used, for example in conjunction with a remote control, in order to allow a user to interact with and/or control an entertainment device, such as a television. Apparatus is therefore required in order to generate an EPG. The apparatus may generate the EPG using information regarding, for example, scheduled programs and/or from user input. Increasingly, such an apparatus is required to process the information in a way in which it can generate output data that can be used to generate an EPG that is easy and intuitive for a user to interact with and/or control the entertainment device. Although reference may be made herein to an EPG being used to control and/or interact with a television set, it will be understood that the EPG could be used to control any appropriate entertainment device. As such, references to the term "television set" herein should be taken to refer to any suitable entertainment device. The term entertainment device should include any possible entertainment device that may interact with or via an EPG, or any entertainment device that may be adapted, presently or in the future, to interact with or via an EPG, such as a television set FIG. 1 shows an apparatus 100 for generating an EPG according to the present invention. The apparatus 100 is configured to output data 108 which may be used to generate an EPG. For example, in the embodiment shown in FIG. 1, the output data 108 is output from the apparatus 100 to a display device 200. Some embodiments may not include the display device 200.

The apparatus 100 for generating an EPG comprises a time selection receiving unit 110. The time selection receiving unit 110 is configured to receive an input time 101 from a user. The input time 101 may be input by any suitable means. For example, the input 101 may be directly input from a remote control with which the EPG is configured to interact. Alternatively or additionally, the input time 101 may originate from a selection made by the user through interacting with the EPG itself.

The apparatus 100 for generating an EPG also comprises a display generation unit 130. The display generation unit 130 is configured to output the data for generating an EPG and/or displaying an EPG. The layout and configuration of the EPG that the display unit 130 is configured to generate may take many forms, examples of which will be described in greater detail below.

The apparatus 100, for example the display generation unit 130, receives an input 102 which contains details including, for example, upcoming program schedule information. The data 102 may originate from, for example, an external database showing scheduled program information for a plurality of channels. The data 102 may be used, for example by the display generation unit 130, to generate an EPG database of upcoming programs. The EPG database may be populated from data carried in Service Information in Digital Television transmissions (i.e. this may be origin of the input data 102). For DVB broadcasts such information may be in the Event Information Table (EIT). EIT may be carried some or all of the broadcast channels (or services) on one or more channel (or services) known as cross-carried EPG data. Present/Following EPG data may also be broadcast for now and next available programs (or events). This can be more accurate as it is updated more frequently and may also be used in the EPG database of the present invention.

Alternatively the EPG database may be populated by a service provider using an alternative network connection to the broadcast network (e.g. an internet connection). In some embodiments thumbnails comprising moving video clips corresponding to scheduled programs may be provided via the alternative network connection and identified by event identifiers corresponding to those in broadcast EPG data in order to relate two or more sources of data to one another. Alternative identifiers are possible. Thumbnails and video clips may also be delivered via the broadcast network. As will be described herein, the tiles representing programs in the EPG may comprise these thumbnails and/or moving video clips.

The display generation unit 130 may also be configured to receive user input information 103. For example, the user input information 103 may relate to, for example, which channels should be displayed on the EPG, or which particular screen (for example of a hierarchical menu structure) of the EPG should be displayed.

The display generation unit 130 is configured to receive time information 104 from the time selection receiving unit 110. This time information 104 allows the time input 101 to the time selection receiving unit 110 to be passed on to the display generation unit 130. This information is used by the display generation unit 130 to generate the EPG, as explained below.

The apparatus 100 is also configured such that the display generation unit 130 is configured to receive calculation data 107 from a calculation unit 120. The calculation unit 120 is configured to take time information 105/106 from both the time selection receiving unit 110 and the display generation unit 130. This time information 105/106 received by the calculation unit 120 provides the earliest time that the EPG generated by the output data 108 would show in an upcoming schedule display region i.e. a portion that shows programs that are either being shown or are to be shown at a current and/or desired time. This time may be the time represented by a reference indicator in the EPG, and may be referred to as such herein. The calculation unit 120 also receives information 106 from the display generation unit 130 that relates to the program being displayed on each of the channels of interest at the time associated with the reference indicator. For example, this information 106 may include the duration of each of the programs being shown on the channels of interest at the time corresponding to the reference indicator.

The calculation unit 120 may be configured to use the information about the time corresponding to the reference indicator and the duration of the program on each channel that is being shown at the time corresponding to the reference indicator in order to calculate a proportion (such as a percentage) of the program being shown on each channel of interest at the time corresponding to the reference indicator that has not yet been shown at that time. The information relating to the portion of the program or programs being shown at the time corresponding to the reference indicator may then be passed from the calculation unit 120 to the display generation unit 130.

The various information that the display generation unit 130 is configured to receive is then processed by the display generation unit 130 in order to generate output data 108 to generate the displayed EPG. Examples of the processing performed by the display generation unit 130, and the EPGs produced by it, are described below in relation to FIGS. 2-5.

Figure 2:
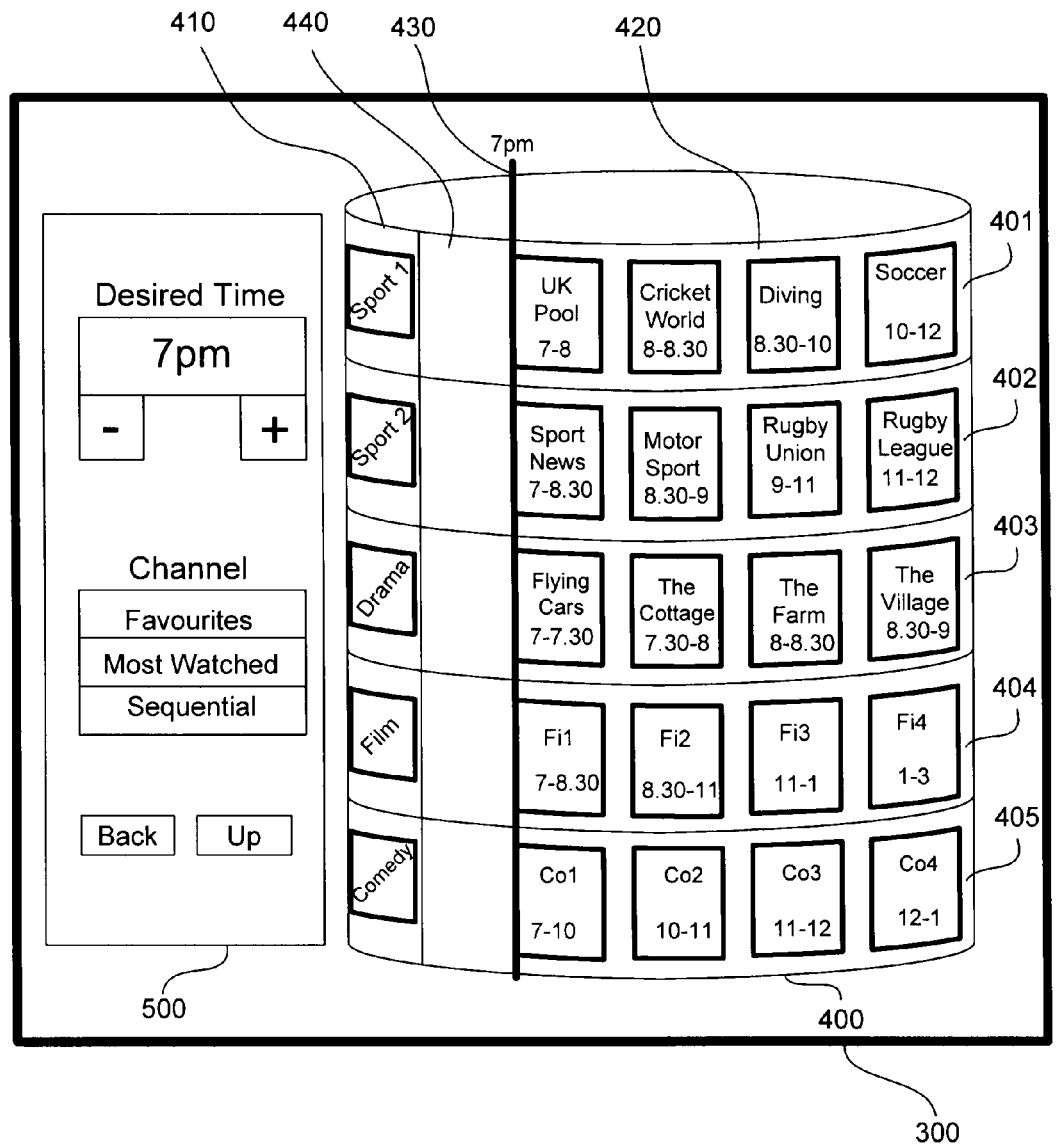
FIG. 2 illustrates an EPG at a first time, the EPG being generated by an apparatus or method according to an embodiment of the present invention.

FIG. 2 shows an EPG 300 with two main areas 400, 500. Guide area 400 shows information relating to current and upcoming programs on various channels. Input area 500 is a user input area through which a user can interact with the television set. As explained below, the user may also be able to interact with the television set through the guide area 400 that displays upcoming programs.

The guide area 400 showing the current and upcoming programs on the various channels of the EPG 300 that is generated by the apparatus 100 will now be described in further detail. The guide area 400 is shown in the embodiment of FIG. 2 as comprising a plurality of cylinders 401, 402, 403, 404, 405. Each cylinder 401, 402, 403, 404, 405 represents a different channel that is available for viewing on the television set. The cylinders are shown one on top of each other. In other words, the cylinders are axially aligned with each other and axially offset from each other in order to form a compound cylinder that comprises each of the cylinders that represents a channel. Of course, other arrangements are within the scope of the invention. For example, each of the cylinders 401, 402, 403, 404, 405 may have a greater axial offset from each other, such that there is a gap between the end faces of each of the cylinders. In other embodiments, the EPG may not comprise any cylinders at all.

Each cylinder comprises a channel region 410, an upcoming schedule display region 420 and a lapsed schedule display region 440. The channel region 410 simply indicates, for example, by means of a tile, which may comprise an icon, picture or movie clip, the channel with which the cylinder is associated. The display generation unit 130 is configured to output current and upcoming programs in the upcoming schedule display region 420, and lapsed portions of programs to the lapsed schedule display region 440.

As shown in FIG. 2, the current and upcoming programs may be mapped onto their respective cylinders by the display generation unit 130 in the form of tiles.

In the upcoming schedule display region 420, only the part of the tile representing a portion of the current program that has not been shown at the time represented by the reference indicator is displayed (plus the other upcoming programs). The rest of the tile is shown in the lapsed schedule display region 440.

Each tile may be generated to have the same size, regardless of the duration of the program represented by the tile. Thus, for example, the tile representing "Cricket World" on the "Sport 1" channel is the same size as the tile representing "Fi2" on the "Film" channel, even though the duration of the "Cricket World" program is half an hour, whereas the duration of the "Fi2" film is two and a half hours. In an embodiment, the precise size of each of the tiles may vary according to its position on the cylinder. However, this variation in size is not related to the duration of the program which the tile represents, but rather to the perspective produced by the position of the tile on the cylinder.

The tiles shown in the EPG of FIG. 2 have the name of the program which they represent written on them. However, in alternative embodiment, the tiles representing programs may be shown differently. For example, each tile might be and/or comprise a picture or icon associated with the program which it represents. Alternatively, each tile, or some of the tiles, may comprise or consist of movie clips or icons relating to the program which they represent.

In the EPG shown in FIG. 2, five cylinders 401, 402, 403, 404, 405 are displayed, each cylinder representing a particular channel. In alternative embodiments, a different number of channels may be shown in the guide area 400. For example, 1, 2, 3, 4, 5, 6, 7, 8, 9, 10, or more than 10 channels can be shown in the guide area 400.

The particular channels that are shown may be a subset of the channels that are available for viewing on the television set which the EPG is used to interact with and/or display information about. The particular channels that are output for display by the display generation unit 130 may be selected by any suitable means. For example, the channels may be individually selected by a user to correspond with those channels which the user is most interested in at a particular time. Alternatively, the channels may be a list of favourite channels that has been previously set up by the user. More than one favourites list may be accessible for display by the display generation unit 130. For example, one list of favourites may correspond to the favourites of one user of the EPG, whereas another user of the EPG may have a different list of favourites available. Alternatively, the channels may represent the most viewed channels for the television which the EPG is being used to control. Information relating to which channels are most viewed may be captured by the apparatus 100 using a data capture unit (not shown).

Alternatively, the channels represented by the cylinders 401, 402, 403, 404, 405 in the EPG 300 may simply be in sequential numerical order. It may be possible for a user to scroll through the various available channels. The user may be able to scroll through the available channels directly by pressing buttons from a remote control used to interact with the EPG. Alternatively, the user may be able to scroll through the channels by highlighting an icon (for example the "Comedy" icon in FIG. 2) at the top or bottom of the EPG using a remote control, and then scrolling up or down respectively using the remote control.

The choice of which channels should be displayed, for example whether they should be favourites, most watched or sequential, may be selected by the user. For example, in the EPG 300 shown in FIG. 2, the input area 500 contains a selection area for selecting which channels to display. If the user were to select and option from this panel, it would be input as information 103 to the display generation unit 130. The display generation unit 130 would use this information to generate the output 108 accordingly.

In the EPG 300 shown in FIG. 2, tiles representing the current program for each channel and the next three programs are displayed for each channel. This is regardless of the duration of the program. In alternative embodiments, tiles representing 1, 2, 3, 4, 5, 6, 7, 8, 9, 10 or more than 10 programs may be displayed for each channel. In still other embodiments, tiles representing programs that are to be shown during a set time period (for example 0.5 hours, 1 hour, 2 hours, 3 hours, 4 hours, 5 hours, or more than five hours) from the time represented by the reference indicator may be displayed in the EPG.

The earliest time for which tiles of programs are displayed (i.e. 7 pm in the example of FIG. 2) may be referred to as the reference time, or first time, or time represented by the reference indicator. When the EPG is first accessed by the user, for example using a remote control, this time represented by the reference indicator may be the same as the current time, i.e. the actual time at which the EPG was accessed. The time represented by the reference indicator (i.e. the earliest time for which programs are displayed on the EPG) may also be selected by the user as a desired time. For example, the user may select the reference time by using input means (such as one or more buttons, a scroll wheel, or a scroll ball) on a remote control. Alternatively or additionally, the user may select the desired reference time using controls on the EPG 300 itself, such as the controls shown at the top of the input area 500 in FIG. 2. This is described in greater detail below.

As shown in FIG. 2, the reference time (i.e. the earliest time for which programs are displayed in the EPG) may be shown on the EPG as a reference indicator 430. The reference indicator 430 is shown as a line in the EPG 300 of FIG. 2. In other embodiments, the reference indicator 430 may be a reference zone.

As shown in the embodiment of FIG. 2, the reference line 430 may pass through, or intersect, the tiles representing programs that are being shown on the respective channels at the time represented by the reference indicator. The reference line may pass through these tiles so as to divide them into two regions. The portion of each tile to a first side of the reference indicator 430 may be proportional in size (for example in area) to the portion (for example percentage) of the program that has lapsed. The portion of each tile to the other side of the reference indicator 430 may be proportional in size (for example in area) to the portion (for example percentage) of the program that has not yet lapsed. As such, the reference indicator 430 may pass through a tile representing a currently showing program that started before the time represented by the reference indicator 430. In some embodiments, the portion of the tiles to the first side of the reference indicator 430 may be in the region of the EPG known as a lapsed schedule display region 440, and the portion of the tiles to the other side of the reference indicator 430 may be in the region of the EPG known as an upcoming schedule display region 420. In other embodiments, the EPG may not be separated into an upcoming schedule display region 420 and a lapsed schedule display region 440, but may instead just have a single schedule display region that has tiles representing both upcoming programs and currently showing programs.

The reference indicator 430 may form a boundary of a part of the tiles representing programs that are currently being shown that are in the upcoming schedule display region 420. The reference indicator 430 may additionally or alternatively form a boundary of a part of the tiles representing programs that are currently being shown that are in the lapsed schedule display region 440.

In the example shown in FIG. 2, the start of each of the programs on the five channels represented by the cylinders 401, 402, 403, 404, 405 that are being shown at the reference time all start at the reference time itself, i.e. all of them start at 7 pm. As such, all of the tiles representing the started programs, i.e. the programs that are currently being shown at the reference time of 7 pm, are shown in the upcoming schedule display region 420 in full. However, as explained below in relation to FIG. 3, the apparatus of the present invention is configured such that if the program being shown at the reference time has already partly been broadcast, or completed, then not all of the corresponding tile is displayed in the upcoming schedule display region 420. In this case, the reference indicator 430 may pass through the tiles representing the currently showing programs. In other words, the tiles representing the currently showing programs may straddle the reference indicator 430.

Figure 3:
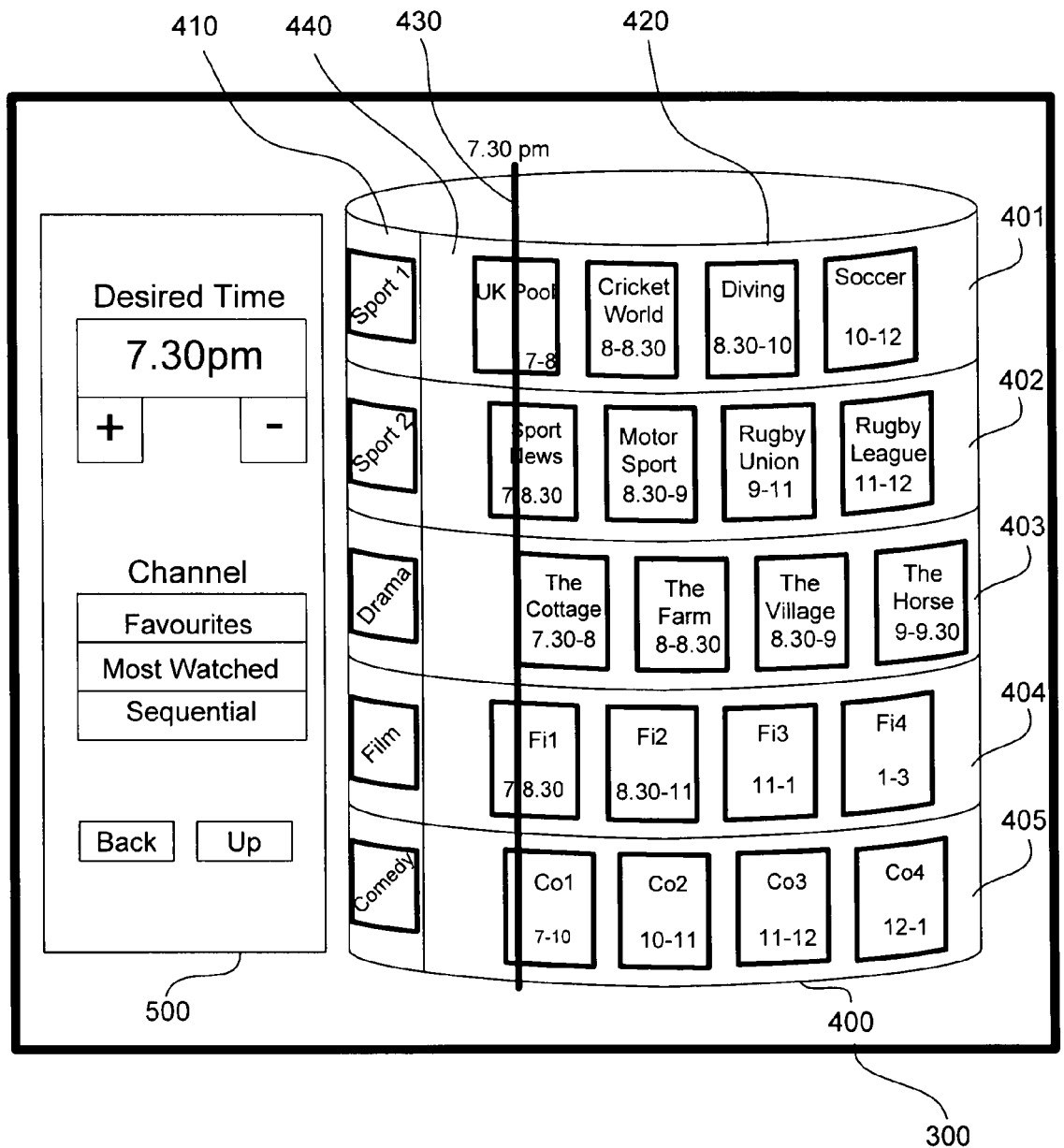
FIG. 3 illustrates an EPG at a second time, the EPG being generated by an apparatus or method according to an embodiment of the present invention.

In FIG. 3, the reference time is 7:30 pm. This may be because the EPG has been re-accessed by a user at 7:30 pm. Alternatively, it may be that the time is not 7:30 pm (for example it could still be 7 pm), but the user has requested to see programs that are being shown at 7:30 pm, and thus the display generation unit 130 has output data accordingly.

As shown in FIG. 3, the currently showing programs at the new reference time of 7:30 pm on the different channels 401, 402, 403, 404, 405 do not have the same portion completed. As such, the portion of the tile representing the program being currently shown at the new reference time of 7:30 pm that is displayed in the upcoming schedule display region 420 is not the same for each channel. Instead, the portion (for example area and/or width) of the tile displayed in the upcoming schedule display region 420 is related to, for example inversely proportional to, the portion of the currently showing (or started) program that has been completed. The portion of the tile may be proportional to the portion of the currently showing (or started) program that has not yet been completed. Thus, for example, only half of the full tile representing the "UK Pool" program being shown on the "Sport 1" channel is displayed in the upcoming schedule display region 420, because at the reference time of 7:30 μm, only half of the full program remains. However, two-thirds (66.7%) of the tile representing the "Sport News" program on the "Sport 2" channel and the "Fi1" film on the "Film" channel is displayed because two-thirds of the those programs remain to be shown. On the "Comedy" channel, the "Co1" program is only one-sixth of the way through, and so the portion of the file representing it that is displayed in the upcoming schedule display region 420 is five-sixths of the total size, this representing the portion of the program remaining.

In the example shown in FIG. 3, the remaining portion of the file representing the program being shown at the tile represented by the reference indicator is displayed in the lapsed schedule display region 440. This portion represents the portion of the program that has already been shown at the reference time. The reference indicator may thus intersect the tiles representing programs being shown at the time represented by the reference indicator at a position that separated them into first and second portions with sizes that correspond to the lapsed and unlapsed portions of the program respectively.

In some embodiments, the portion of the time representing the part of the program that has already been displayed may be shaded, darkened, or otherwise modified, or it may not be shown in the EPG at all.

As explained above in relation to FIG. 1, the calculation unit 120 is used to calculate the portion of the currently showing programs (i.e. the programs being shown at the time represented by the reference indicator) that remain on each channel at any given reference time. In order to calculate this, the calculation unit 120 takes as input the reference time (which may be, for example, via a user input, through input 105 in FIG. 1, or from the display generation unit 130, through input arrow 106 shown in FIG. 1). The calculation unit also takes as input information regarding the duration of the currently showing programs from an appropriate source. In the example shown in FIG. 1, this information regarding the duration of the currently showing programs is provided by the display generation unit 130, via arrow 106. In alternative embodiments, the information relating to the duration of the currently showing programs may be provided to the calculation 120 from another source, such as an external database containing information about the currently showing and/or upcoming programs. In such an embodiment, the drawings shown in FIG. 1 could be modified to have another input arrow from outside the apparatus 100 to represent the information relating to program duration being provided to the calculation unit 120 from an external source.

The calculation unit 120 uses the information relating to the reference time and the duration of the currently showing programs to calculate a portion (or percentage) of the currently showing program that remains (or that has already be shown). As explained above, the calculation unit 120 provides this information to the display generation unit 130, as shown by arrow 108 in FIG. 1. The display generation unit 130 uses the data provided by the calculation unit 120 to output data to show tiles representing the programs being shown at the time represented by the reference indicator in the correct position in the EPG relative to the reference indicator 430.

The EPG is updated to include new tiles when one of the programs in the EPG finishes. As such, a tile representing "The Horse" has been added to the "Drama" channel between FIG. 2 and FIG. 3, because "Flying Cars" has finished.

In the example EPG 300 produced by the apparatus 100 for generating an EPG shown in FIG. 3, the gap between each of the tiles is the same, and constant. Thus, in addition to the tiles representing the programs being shown at the time represented by the reference indicator moving towards (and past) the reference indicator 430 by a calculated amount, the other tiles representing subsequent programs on the same channels may also move by the same calculated amount towards the reference indicator 430. Thus, the gap between each of the tiles on each channel may remain constant.

In an alternative embodiment, the display generation unit 130 may be configured to output data to show the positions of the tiles representing subsequent programs (i.e. all those tiles that do not represent programs being shown at the time represented by the reference indicator) to be in a constant position regardless of what portion of the tile representing the currently showing program is displayed. In such an embodiment, each cylinder 401, 402, 403, 404, 405 would have a set position for the tile on the cylinder assigned to each tile representing an upcoming program. As such, the gap between the tile representing the program being shown at the time represented by the reference indicator and the program to be shown next would vary depending on how much of the program being shown at the time represented by the reference indicator has been already shown. For example, the gap may vary by an amount which is equal to a constant amount in addition to an amount which is proportional to the portion of the program being shown at the time represented by the reference indicator that has already been shown. The gap between the tiles representing each of the subsequent programs may, however, remain constant in such an embodiment.

The user may change the time from which they want to view programs in the EPG (which may be referred to as the desired time) when the EPG is being shown. In this case, the display generation unit 130 acts to output data to update the EPG to the desired time. This is explained below in relation to FIGS. 4A and 4B.

Figure 4A:
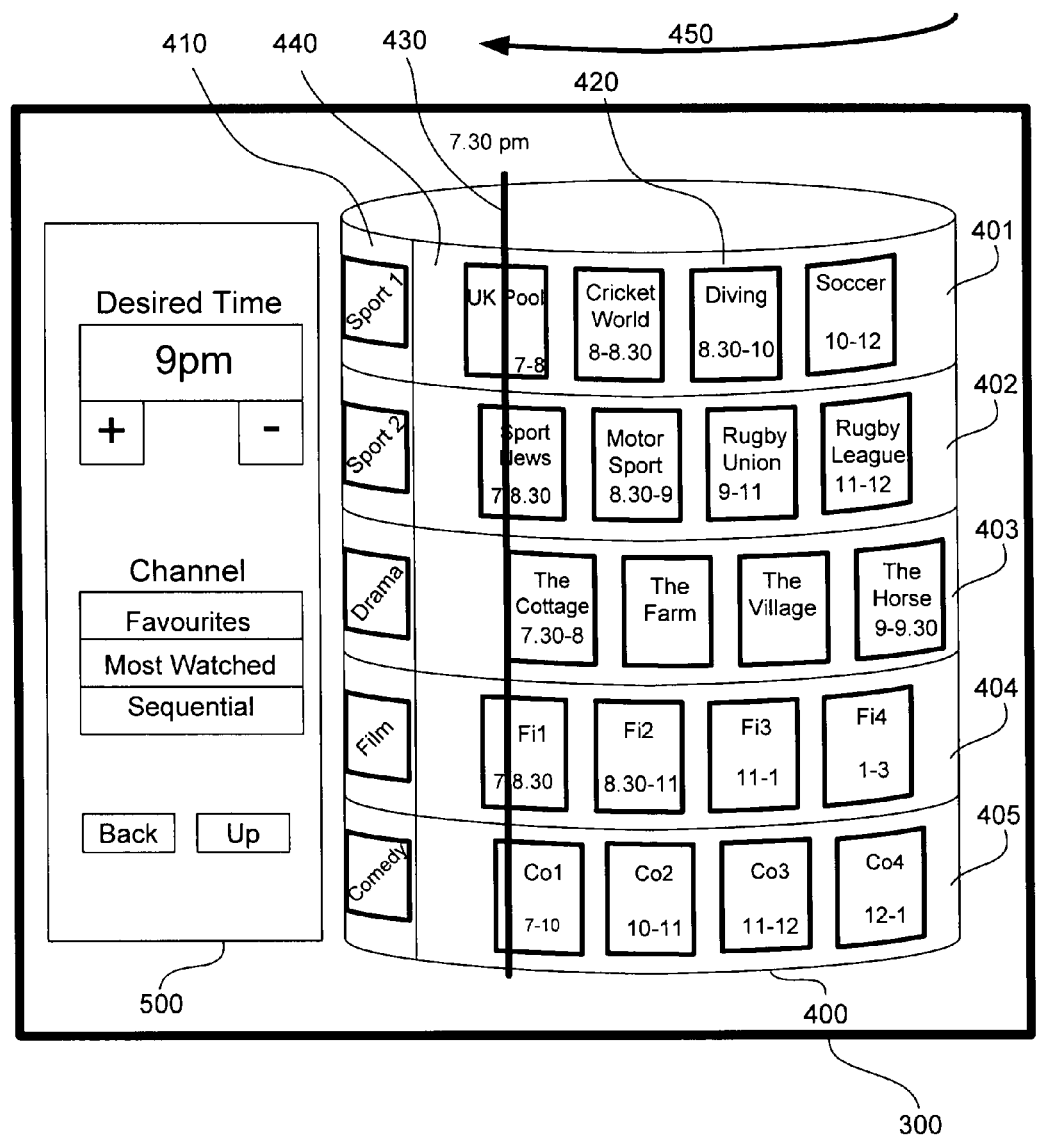
FIG. 4A illustrates an EPG generated by an apparatus or method of the present invention when it is updating from the reference indicator representing a first time to the reference indicator representing a desired time.

In FIG. 4A, the desired time is 9 pm. This is shown in the input area 500 of the EPG 300. The desired time may have been input by any suitable means, for example via selection on the EPG, or via an input device (such as one or more buttons, a scroll wheel, or a scroll ball) on a remote control.

As shown in FIG. 4A, the reference time represented by the reference line 430 is still 7:30 pm. This may indicate that, for example, the user of the EPG has just input a command to the apparatus 100, for example via arrow 103 in FIG. 1, to change the desired time from 7:30 pm to 9 pm. When the desired time is changed to 9 pm, the display generation unit 130 acts to output data 108 to update the EPG (for example the upcoming schedule display region 420 and/or the lapsed schedule display region 440 of the EPG) through animation. In order to do this, the display generation unit 130 is configured to output data to scroll at least the tiles representing the program being shown at the time corresponding to the reference indicator in a direction towards (in the event that the desired time is after the reference time) or away from (in the event that the desired time is before the reference time) the reference indicator 430. In some embodiments, just the tile that represents the program being shown at the time represented by the reference indicator is scrolled by the display generation unit; in other embodiments, all of the tiles on the channel are scrolled by the display generation unit 130. In the event that all of the tiles are scrolled by the display generation unit 130, all of the tiles representing programs on a single channel may be scrolled at the same rate, and in the same direction. Further, as explained below, the tiles on different channels may be scrolled at different rates.

In the embodiment shown in FIG. 4A, the upcoming schedule display region 420 and the lapsed schedule display region 440 of each of the cylinders 401, 402, 403, 404, 405 is caused to be rotated about its longitudinal axis by the data output by the apparatus 100. Because, in the example of FIG. 4A, the desired time (9 pm) is after the current reference time (7:30 pm), the cylinders are rotated in the direction of arrow 450, i.e. towards the reference indicator 430. In rotating this portion of the cylinder, each of the tiles displayed for that cylinder is rotated along with the cylinder itself.

The rate at which each cylinder 401, 402, 403, 404, 405 is rotated is related to the total duration of the program being shown at the reference time as indicated by the reference indicator 430. For example, the rate of rotation of each cylinder 401, 402, 403, 404, 405 may be in inverse proportion to the total duration of the program currently being shown at the reference time of each channel. As such, the upcoming and lapsed schedule display regions 420, 430 of the cylinder 405 corresponding to the "Comedy" channel may be caused by the output data to rotate at half of the rate that the upcoming and lapsed schedule display regions 420, 430 of the cylinder 404 corresponding to the "Film" channel is configured to rotate in the example shown in FIG. 4A. This is because the program being shown at the current reference time on the "Comedy" channel ("Co1") is twice as long as the program ("Fi1") being shown on the "Film" channel.

Similarly, the upcoming and lapsed schedule display regions 420, 440 of the cylinder 403 corresponding to the "Drama" channel may be caused to rotate six times as fast as the upcoming and lapsed schedule display regions 420, 440 of the cylinder 405 corresponding to the "Comedy" channel. This is because the program currently being shown at the reference time on the "Drama" channel is one-sixth of the total duration of the program being shown on the "Comedy" channel.

As the EPG is updated by the apparatus for generating an EPG from the current reference time to the desired time, so the time represented by the reference indicator 430 changes. This change may be continuous. Because of the scrolling of the tiles (for example due to the scrolling of at least a part of the cylinders 401, 402, 403, 404, 405), the EPG 300 may be updated by the apparatus such that it is always accurate for the time represented by the reference indicator 430. As the time represented by the reference indicator 430 changes, so the label (which shows 7:30 pm in FIG. 4A) is updated. The animation of the EPG (which may include the updating of the time labels) may be continuous or substantially continuous. The animation may update the EPG in discrete time blocks. For example the EPG may be animated so as to update such that the reference indicator and EPG increment in blocks in the range of from 1 second to 30 minutes, or in the range of from 2 seconds to 10 minutes, or in the range of from 5 seconds to 5 minutes, or in the range of from 10 seconds to 2 minutes, or in the range of from 30 seconds to 1 minute. The updating of the EPG may be automatic. Furthermore, the EPG may be configured to be automatically updated if it is displayed for a period of time, such that the reference indicator always represents the current time.

Figure 4B:
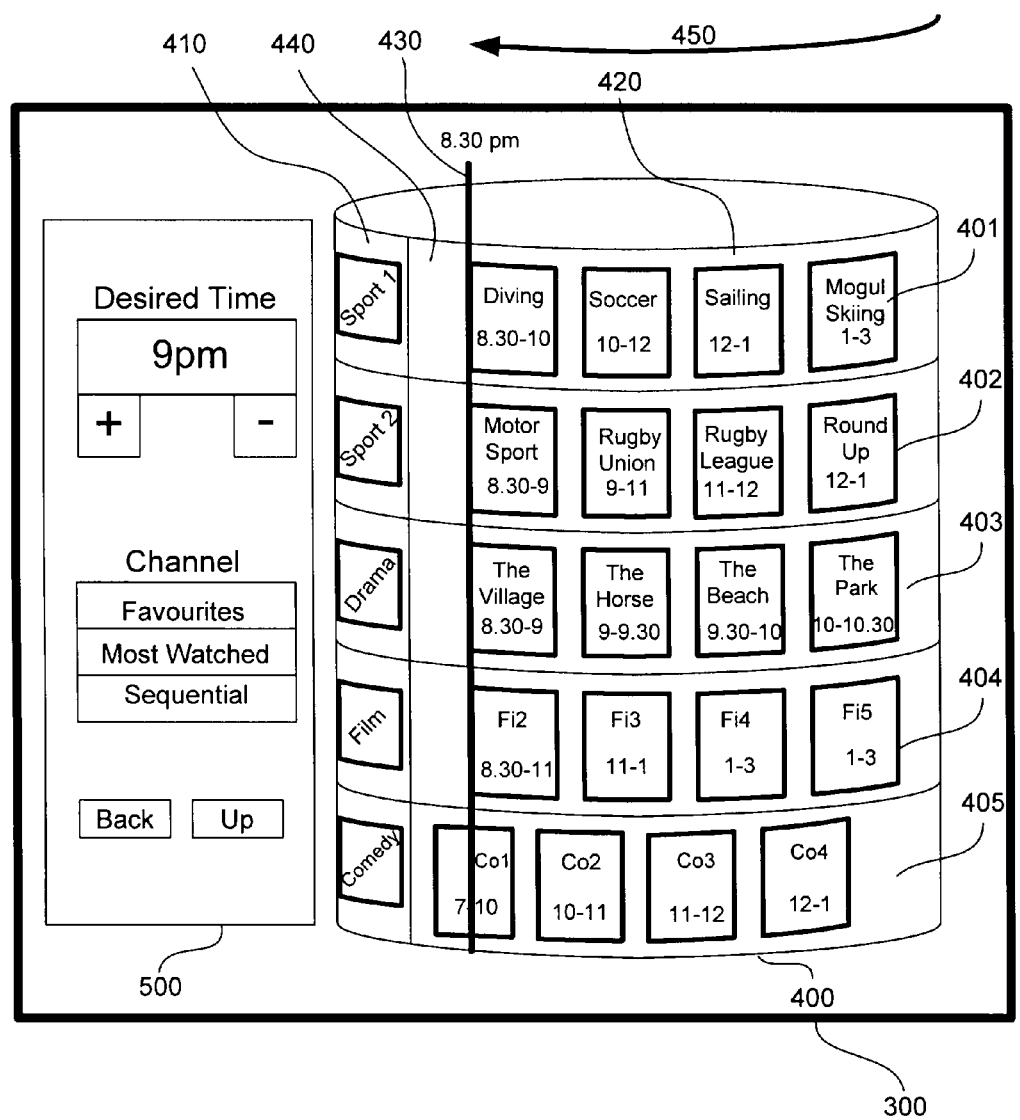
FIG. 4B illustrates an EPG generated by an apparatus or method of the present invention when the EPG is at a different position from that in FIG. 4B in updating from the reference indicator representing a first time to the reference indicator representing a desired time.

As the time represented by the reference indicator 430 changes, so the current program being shown by the time represented by the reference indicator 430 may change from channel to channel. As such, the scrolling rate of the tiles (and thus in the examples shown in FIGS. 4A and 4B the rotation rate of the schedule display regions 420, 440 of the cylinders 401, 402, 403, 404, 405) may change as the EPG is updated to the desired time. For example, FIG. 4B shows the EPG 300 during update to the desired time of 9 pm, when the reference time has reached 8:30 pm. Taking the example of, for example, the cylinder 402 representing the "Sport 2" channel, the program currently being shown at the time represented by the reference indicator 430 has changed from "Sport News" in FIG. 4A to "Motor Sport" in FIG. 4B. Because the "Motor Sport" program is a third of the duration of the "Sport News" program (30 minutes as opposed to 90 minutes), the rate of rotation of the schedule display regions 420, 440 of the cylinder 402 is three times as great at 8:30 pm (in FIG. 4B) than it was at 7:30 pm (in FIG. 4A). Similarly, the rate of rotation of the schedule display regions 420, 440 of the other cylinders 401, 403, 404, 405 may also change in inverse proportion to the duration of the program being shown at the time represented by the reference indicator 430 as the EPG 300 is updated by the apparatus 100.

The updating of the EPG has mainly been described above in relation to the cylindrical display of FIGS. 4A and 4B. However, it will be understood that in different embodiments, the EPG may not comprise a cylindrical display. For example, the area 400 of the EPG 300 may be a rectangle (or square) such as the area 600 shown in the EPG of FIG. 5. In such an embodiment, the tile representing the program being shown at the time represented by the reference indicator 430 may be scrolled at the appropriate rate. The rate may be as described above in relation to the cylinder rotation rate in FIGS. 4A and 4B. As explained above, in some embodiments just the tile representing the program being currently shown may be scrolled, whereas in other embodiments all of the tiles representing upcoming programs on a channel may be scrolled (for example at the same rate), in addition to the tile representing a program being currently shown. In the example EPG shown in FIG. 5, the apparatus 100 is configured to scroll the tiles in the direction of arrow 650 if the desired time were increased to a later time than 7 pm, for example 9 pm.

Figure 5:
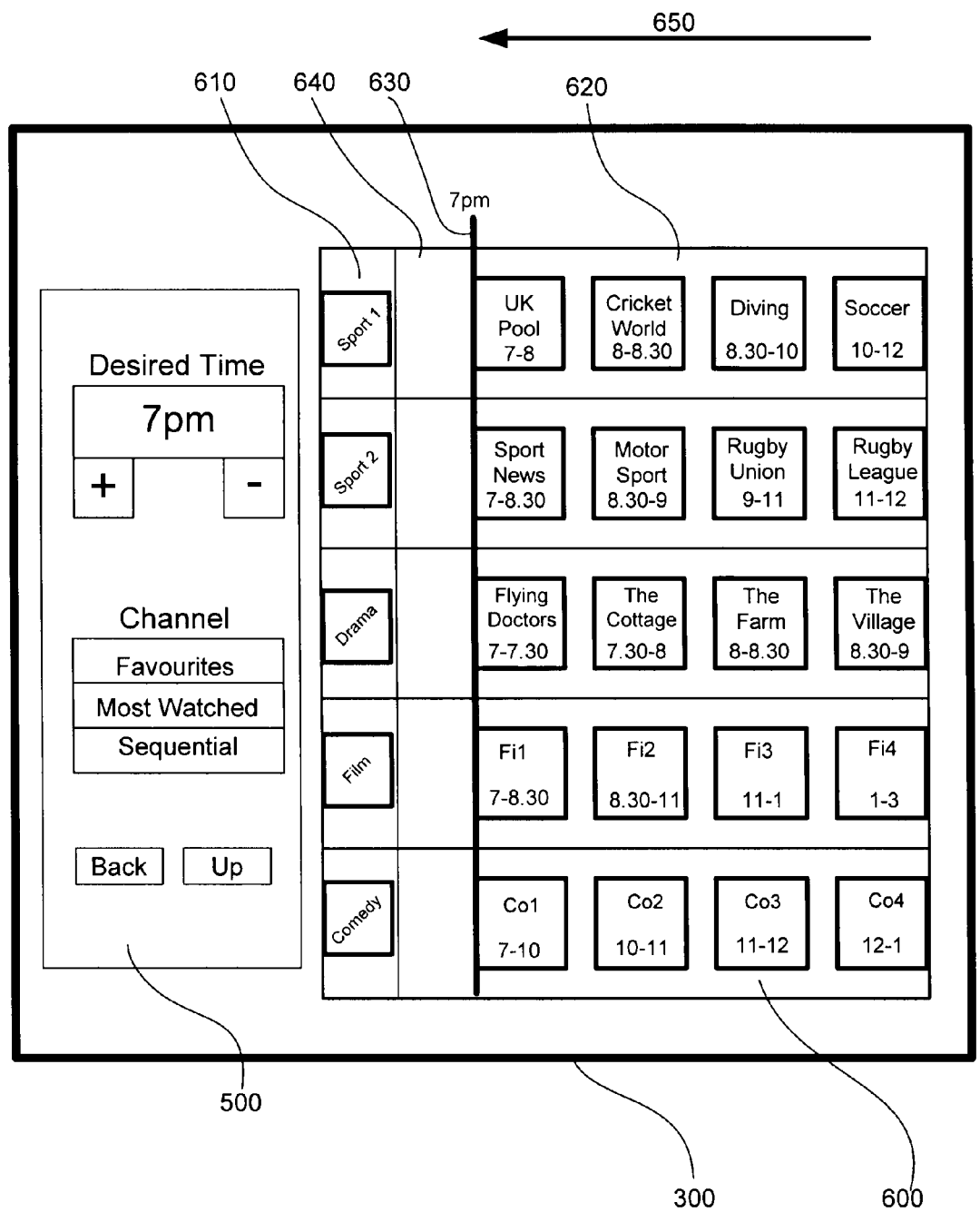
FIG. 5 illustrates an alternative EPG that may be generated by an apparatus or method according to the present invention.

In the example of FIG. 5, the EPG 300 has an upcoming schedule display region 620, a reference indicator 630, a lapsed schedule display region 640, and a channel region 610.

In any embodiment, the scroll rate of the tiles (or rotation rate of the cylinders) may be a predefined function of the duration of the program. For example, a program of duration one hour may always lead to a scroll (or rotation) rate of a predetermined value, whereas a program lasting two hours may always lead to a scroll (or rotation) rate of a predetermined level that is half that of the program lasting one hour. Alternatively, the apparatus 100 may be configured to output data to scroll (or rotate) the tiles at a rate which depends on the actual duration of all of the programs currently being shown on the channels in the EPG and their relative durations. Thus, whilst a tile representing a program that is twice as long as a program on another channel would always be scrolled at half the rate of the tile on the other channel, the absolute rate of scroll (and/or rotation) may be dependent on the longest (and/or shortest) program currently being shown on all of the channels in the EPG.

Although the invention has been described in relation to a method and apparatus for producing the EPGs shown in FIGS. 2-5, it will be appreciated that any other suitable layout of EPG could be output by the apparatus 100 or the method of the present invention.

We claim:

1. An apparatus for generating an electronic program guide (EPG), the apparatus comprising:
    a display generating circuit configured to output data to generate an EPG having an upcoming schedule display region which includes a plurality of channels and, for each channel of the plurality of channels, the upcoming schedule display region includes a started program that is scheduled to begin broadcast at or before a first time and scheduled programs that are scheduled to not begin broadcast by the first time, all said started programs and said scheduled programs represented by equally sized tiles in the EPG; and
    a calculating circuit configured to calculate a non-elapsed portion of time of each started program that has not completely elapsed at said first time, each started program being a program that is shown at said first time on any of the plurality of channels, wherein
    the display generating circuit is further configured to output data to:
        generate a reference indicator in the EPG at a position that corresponds to the first time, the reference indicator being a line that forms a boundary of the upcoming schedule display region of the EPG;
        display the tiles representing started programs at positions in the EPG such that, for each said tile that respectively represents each started program, each tile is divided into a non-elapsed portion and an elapsed portion by the reference indicator with only the non-elapsed portion of each tile displayed in the upcoming schedule display region, and a ratio between an area of the non-elapsed portion of each tile and a total area of each tile is equal to a ratio between the non-elapsed portion of time of each started program that has not completely elapsed at said first time, corresponding to the reference indicator, and a total time for each started program; and
        map each tile of the plurality of channels onto a surface of a respective cylinder of a plurality of cylinders, each cylinder representing a different channel displayed in the EPG, each tile of a same channel is mapped onto a same cylinder and tiles of different channels are mapped onto different cylinders, and
    the plurality of cylinders are axially aligned and axially offset from each other such that the EPG includes a compound cylinder showing program information from the plurality of channels.

2. The apparatus according to claim 1, wherein
    the display generating circuit is further configured to:
        output data to generate a lapsed schedule display region in the EPG, and
        display the elapsed portion of each tile representing a started program in the lapsed schedule display region, the elapsed portion not including the non-elapsed portion of each tile that is displayed in the upcoming schedule display region, and
    the reference indicator is a boundary between the upcoming schedule display region and the lapsed schedule display region of the EPG.

3. The apparatus according to claim 1, wherein the reference indicator is displayed at a fixed position in the EPG.

4. The apparatus according to claim 1, wherein the display generating circuit is further configured to
output data to generate the tiles for the started programs and the scheduled programs, and
map a same fixed number of tiles on each cylinder of said plurality of cylinders.

5. The apparatus according to claim 1, further comprising a time selection receiving circuit configured to receive a desired time input by a user, wherein
having received a desired time input based on the desired time input by the user, the display generating circuit is configured to update the EPG to show the scheduled programs for the plurality of channels starting from said desired time by outputting data to:
update, over a period of time and in a continuous manner, a time to which the reference indicator corresponds from the first time to the desired time; and
scroll the tiles that represent the programs shown on each channel at the time represented by the reference indicator past the reference indicator to continuously update the EPG such that the EPG corresponds to the time represented by the reference indicator.

6. The apparatus according to claim 5, wherein the display generating circuit is further configured to output data to scroll all of the tiles in the EPG towards or away from the reference indicator to continuously update the EPG such that the EPG corresponds to the time represented by the reference indicator.

7. The apparatus according to claim 5, wherein the display generating circuit is further configured to output data to scroll each tile at a rate that is inversely proportional to a total duration of the program shown on the channel to which the tile is associated at the time represented by the reference indicator.

8. The apparatus according to claim 5, wherein the display generating circuit is further configured to output data to rotate each of the cylinders to scroll the tiles towards or away from the reference indicator.

9. The apparatus according to claim 8, wherein the display generating circuit is further configured to output data to rotate said at least the part of each cylinder at a rate that is inversely proportional to a total duration of the program shown on the channel to which the respective cylinder is associated at the time represented by the reference indicator.

10. The apparatus according to claim 1, further comprising a display device, wherein the display generating circuit is further configured to output the display data to the display device so as to generate an EPG on the display device.

11. A television set comprising the apparatus according to claim 1.

12. A set-top box comprising the apparatus according to claim 1.

13. A method of generating an electronic program guide (EPG), the method comprising:
generating, using circuitry, an EPG having an upcoming schedule display region which includes a plurality of channels and, for each channel of the plurality of channels, the upcoming schedule display region includes a started program that is scheduled to begin broadcast at or before a first time and scheduled programs that are scheduled to not begin by the first time, all said started programs and said scheduled programs represented by equally sized tiles in the EPG;
calculating, using the circuitry, a non-elapsed portion of time of each started program that has not completely elapsed at said first time, each started program being a program shown at said first time on any of the plurality of channels;
generating a reference indicator in the EPG at a position that corresponds to the first time, the reference indicator being a line that forms a boundary of the upcoming schedule display region of the EPG;
displaying the tiles representing starting programs at positions in the EPG such that, for each said tile that respectively represents each started program, each tile is divided into a non-elapsed portion and an elapsed portion by the reference indicator with only the non-elapsed portion of each tile displayed in the upcoming schedule display region, and a ratio between an area of the non-elapsed portion of each tile and a total area of each tile is equal to a ratio between the non-elapsed portion of time of each started program that has not completely elapsed at said first time, corresponding to the reference indicator, and a total time for each started program;
mapping each tile of the plurality of channels onto a surface of a respective cylinder of a plurality of cylinders, each cylinder representing a different channel displayed in the EPG, each tile of a same channel is mapped onto a same cylinder and tiles of different channels are mapped onto different cylinders; and
axially aligning and axially offsetting the plurality of cylinders from each other such that the EPG includes a compound cylinder showing program information from the plurality of channels.

14. The method of generating an EPG according to claim 13, further comprising:
generating, using the circuitry, a lapsed schedule display region in the EPG; and
displaying the elapsed portion of each tiles representing a started program in the lapsed display region, the elapsed portion not including the non-elapsed portion of each tile that is displayed in the upcoming schedule display region, wherein
the reference indicator is a boundary between the upcoming schedule display region and the lapsed schedule display region of the EPG.

15. The method according to claim 13, further comprising:
receiving, using the circuitry, a desired time selected by a user, said desired time being different from said first time; and
updating the EPG, using the circuitry, to show scheduled programs for the plurality of channels starting from said desired time by:
updating, over a period of time and in a continuous manner, a time to which the reference indicator corresponds from said first time to said desired time; and
scrolling the tiles past the reference indicator to continuously update the EPG such that the EPG corresponds to the time represented by the reference indicator.

16. The method according to claim 13, further comprising: displaying the EPG on a display device.

17. A non-transitory computer-readable storage medium storing computer-readable instructions that, when executed by a computer, cause the computer to perform the method according to claim 13.

18. The apparatus according to claim 5, wherein the display generating circuit is further configured to:
output data to scroll each tile representing a program scheduled to begin broadcast at or before the time represented by the reference indicator at a rate that is inversely proportional to a total duration of the program to which the tile is associated; and output data to not scroll tiles that represent programs that are scheduled to begin broadcast by the time represented by the reference indicator.

19. The apparatus according to claim 1, further comprising:
- a time selection receiving circuit configured to receive a desired time input by a user; and
- a channel selection receiving circuit configured to receive a selected channel input by the user, wherein
- the display generating circuit is configured to update the EPG to show the scheduled programs for the selected channel starting from the desired time by outputting data to:
  - update, over a period of time and in a continuous manner, a time to which the reference indicator corresponds from the first time to the desired time,
  - scroll the tiles that represent the programs shown on the selected channel at the time represented by the reference indicator past the reference indicator, and
  - maintain the tiles represent the programs shown on each channel that is not the selected channel so that only the tiles on the selected channel are continuously updated such only the selected channel corresponds to the time represented by the reference indicator.

* * * * *